(12) United States Patent
Zhang et al.

(10) Patent No.: US 12,177,858 B2
(45) Date of Patent: Dec. 24, 2024

(54) REFERENCE SIGNAL PROTECTION IN A FULL-DUPLEX MODE

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 17/454,235

(22) Filed: Nov. 9, 2021

(65) Prior Publication Data
US 2023/0141830 A1    May 11, 2023

(51) Int. Cl.
| | |
|---|---|
| *H04W 72/23* | (2023.01) |
| *H04L 1/00* | (2006.01) |
| *H04W 72/1268* | (2023.01) |
| *H04W 72/542* | (2023.01) |

(52) U.S. Cl.
CPC ....... *H04W 72/23* (2023.01); *H04W 72/1268* (2013.01); *H04W 72/542* (2023.01); *H04L 1/0013* (2013.01)

(58) Field of Classification Search
CPC ... H04W 72/21; H04W 72/23; H04W 72/231; H04W 72/232; H04L 5/0051; H04L 5/0055; H04L 5/0094; H04L 1/1671; H04L 1/1854; H04L 5/0048; H04L 5/0053
See application file for complete search history.

(56) References Cited

U.S. PATENT DOCUMENTS

| | | | |
|---|---|---|---|
| 2022/0182160 A1* | 6/2022 | Su | H04B 17/309 |
| 2022/0216976 A1* | 7/2022 | Zhang | H04B 17/327 |

FOREIGN PATENT DOCUMENTS

KR    20210000314 A  *  1/2021

* cited by examiner

*Primary Examiner* — Shailendra Kumar
(74) *Attorney, Agent, or Firm* — Procopio, Cory, Hargreaves & Savitch LLP

(57) ABSTRACT

A UE receives a configuration for one or more downlink reference signal or downlink channel from a base station and receives an indication of one or more time and frequency resources for full-duplex communication at the base station. The UE skips reception of the one or more downlink reference signal or downlink channel based at least in part on the indication of the one or more time and frequency resources for the full-duplex communication at the base station. A UE receives, from a base station, an allocation of uplink resources for an uplink transmission and receives an indication of one or more time and frequency resources for full-duplex communication at the base station. The UE transmits the uplink transmission to avoid the one or more time and frequency resources for the full-duplex communication at the base station.

27 Claims, 14 Drawing Sheets

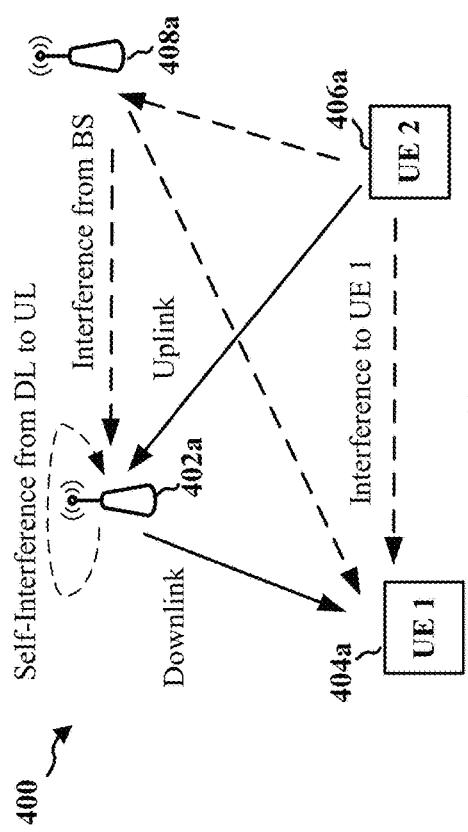
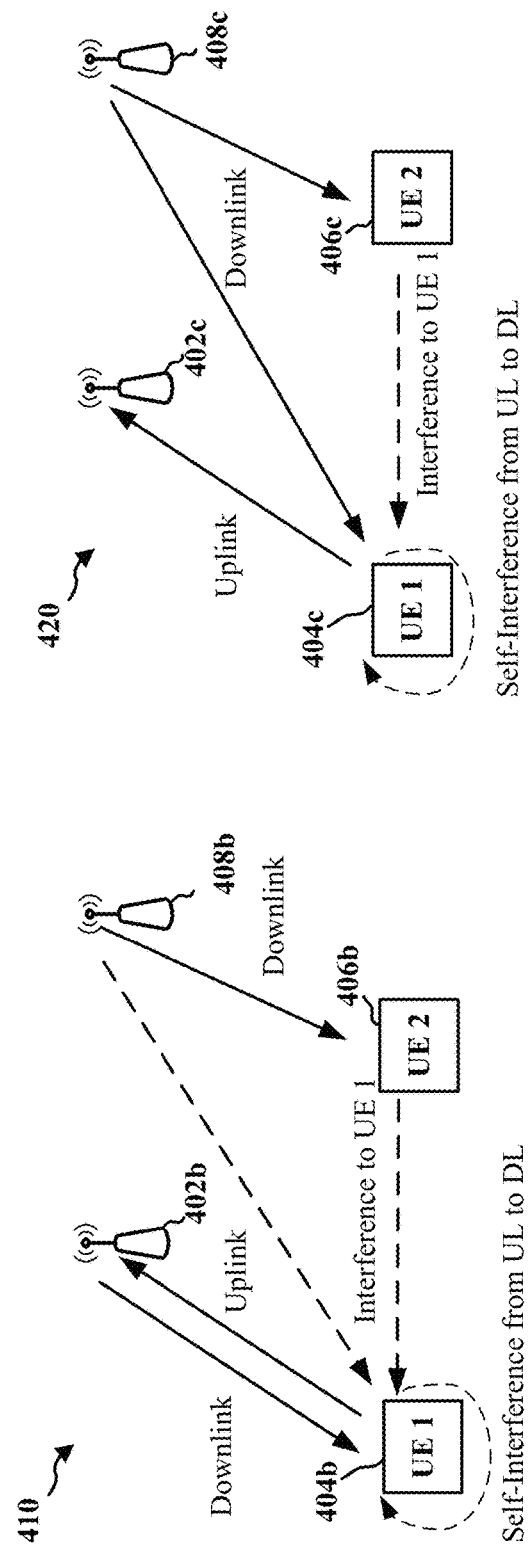
FIG. 4A
FIG. 4B
FIG. 4C

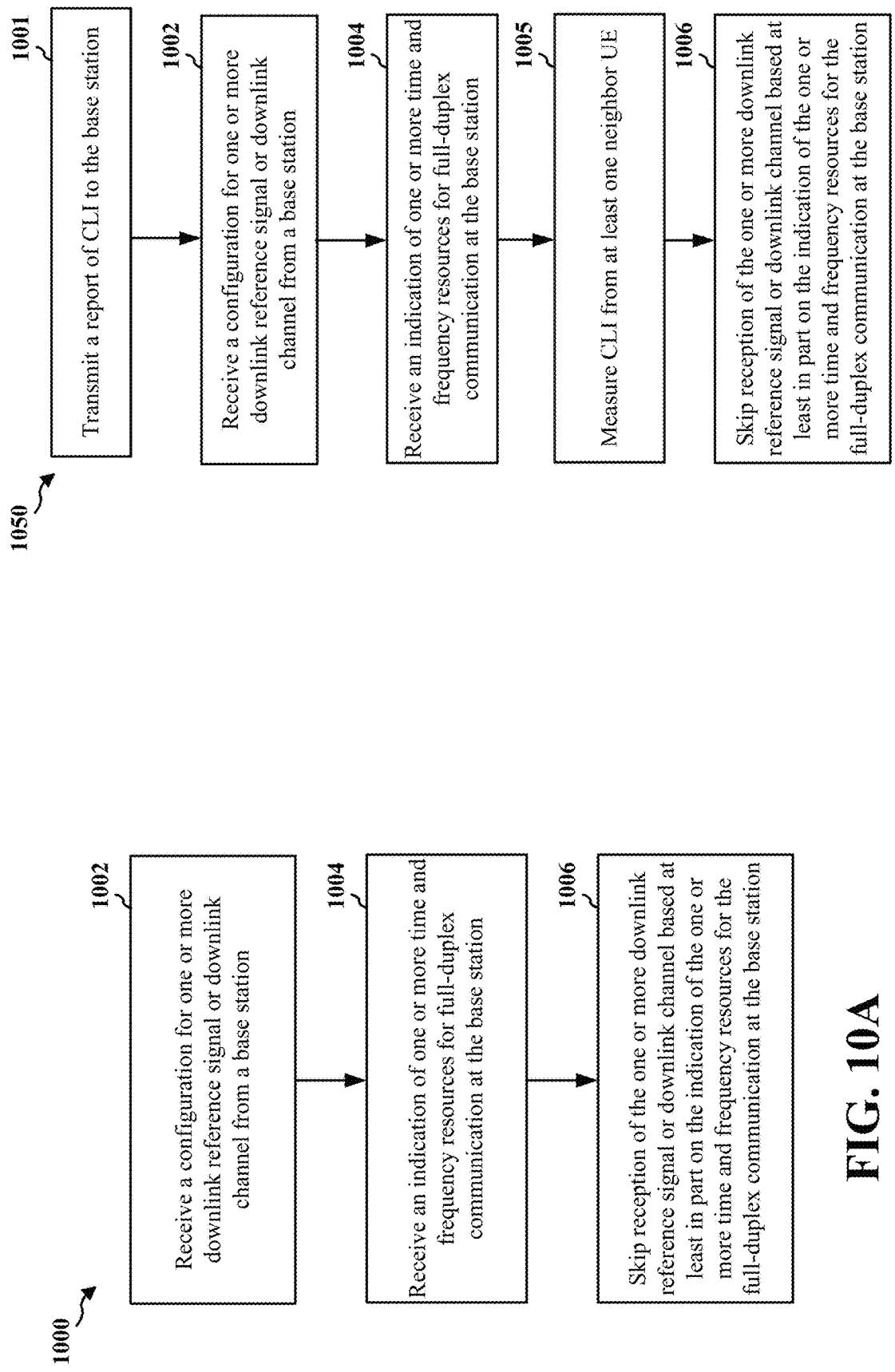

REFERENCE SIGNAL PROTECTION IN A FULL-DUPLEX MODE

TECHNICAL FIELD

The present disclosure relates generally to communication systems, and more particularly, to wireless communication including full-duplex communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a user equipment (UE) are provided. The apparatus receives a configuration for one or more downlink reference signal or downlink channel from a base station and receives an indication of one or more time and frequency resources for full-duplex communication at the base station. The apparatus skips reception of the one or more downlink reference signal or downlink channel based at least in part on the indication of the one or more time and frequency resources for the full-duplex communication at the base station.

In an aspect of the disclosure, a method, a computer-readable medium, and an apparatus for wireless communication at a UE are provided. The apparatus receives, from a base station, an allocation of uplink resources for an uplink transmission and receives an indication of one or more time and frequency resources for full-duplex communication at the base station. The apparatus transmits the uplink transmission to avoid the one or more time and frequency resources for the full-duplex communication at the base station.

In an aspect of the disclosure, a method, a computer-readable medium, and an apparatus for wireless communication at a base station are provided. The apparatus schedules full duplex communication including one or more downlink reference signal or downlink channel from the base station and an allocation of uplink resources for an uplink transmission to the base station based on cross link interference (CLI) to a reception of the one or more downlink reference signal or downlink channel at a first UE and transmits the one or more downlink reference signal or downlink channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A shows a first example of full-duplex communication in which a first base station is in full duplex communication with a first UE and a second UE, in accordance with various aspects of the present disclosure.

FIG. 4B shows a second example of full-duplex communication in which a first base station is in full-duplex communication with a first UE, in accordance with various aspects of the present disclosure.

FIG. 4C shows a third example of full-duplex communication in which a first UE is a full-duplex UE in communication with a first base station and a second base station, in accordance with various aspects of the present disclosure.

FIGS. 10A and 10B are flowcharts of methods of wireless communication, in accordance with various aspects of the present disclosure.

DETAILED DESCRIPTION

Figure 1:
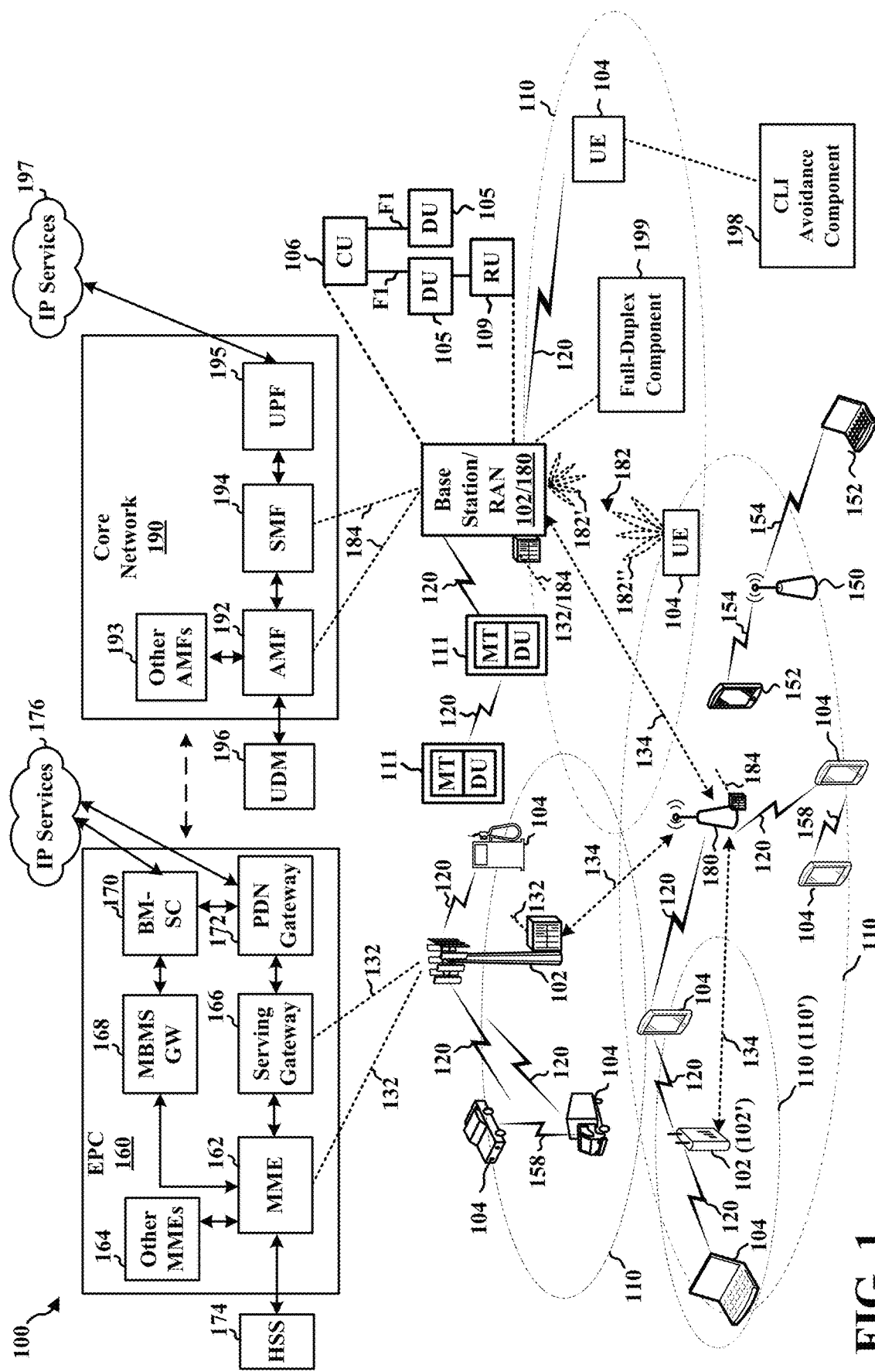
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CLI avoidance component 198 that is configured to receive a configuration for one or more downlink reference signal or downlink channel from a base station 102 or 180 and receive an indication of one or more time and frequency resources for full-duplex communication at the base station 102 or 180. The CLI avoidance component 198 may be configured to skip reception of the one or more downlink reference signal or downlink channel based at least in part on the indication of the one or more time and frequency resources for the full-duplex communication at the base station 102 or 180. In some aspects, the CLI avoidance component 198 may be configured to receive, from a base station 102 or 180, an allocation of uplink resources for an uplink transmission and receives an indication of one or more time and frequency resources for full-duplex communication at the base station 102 or 180. The CLI avoidance component 198 may be configured to transmit the uplink transmission to avoid the one or more time and frequency resources for the full-duplex communication at the base station 102 or 180.

In some aspects, a base station 102 or 180 may include a full-duplex component 199 configured to schedule full duplex communication including one or more downlink reference signal or downlink channel from the base station and an allocation of uplink resources for an uplink transmission to the base station based on CLI to a reception of the one or more downlink reference signal or downlink channel at a first UE. The base station 102 or 180 may be configured to transmit the one or more downlink reference signal or downlink channel, e.g., to a UE 104.

Although the following description may be focused on 5G NR, the concepts described herein may be applicable to other similar areas, such as LTE, LTE-A, CDMA, GSM, and other wireless technologies.

Figure 2:
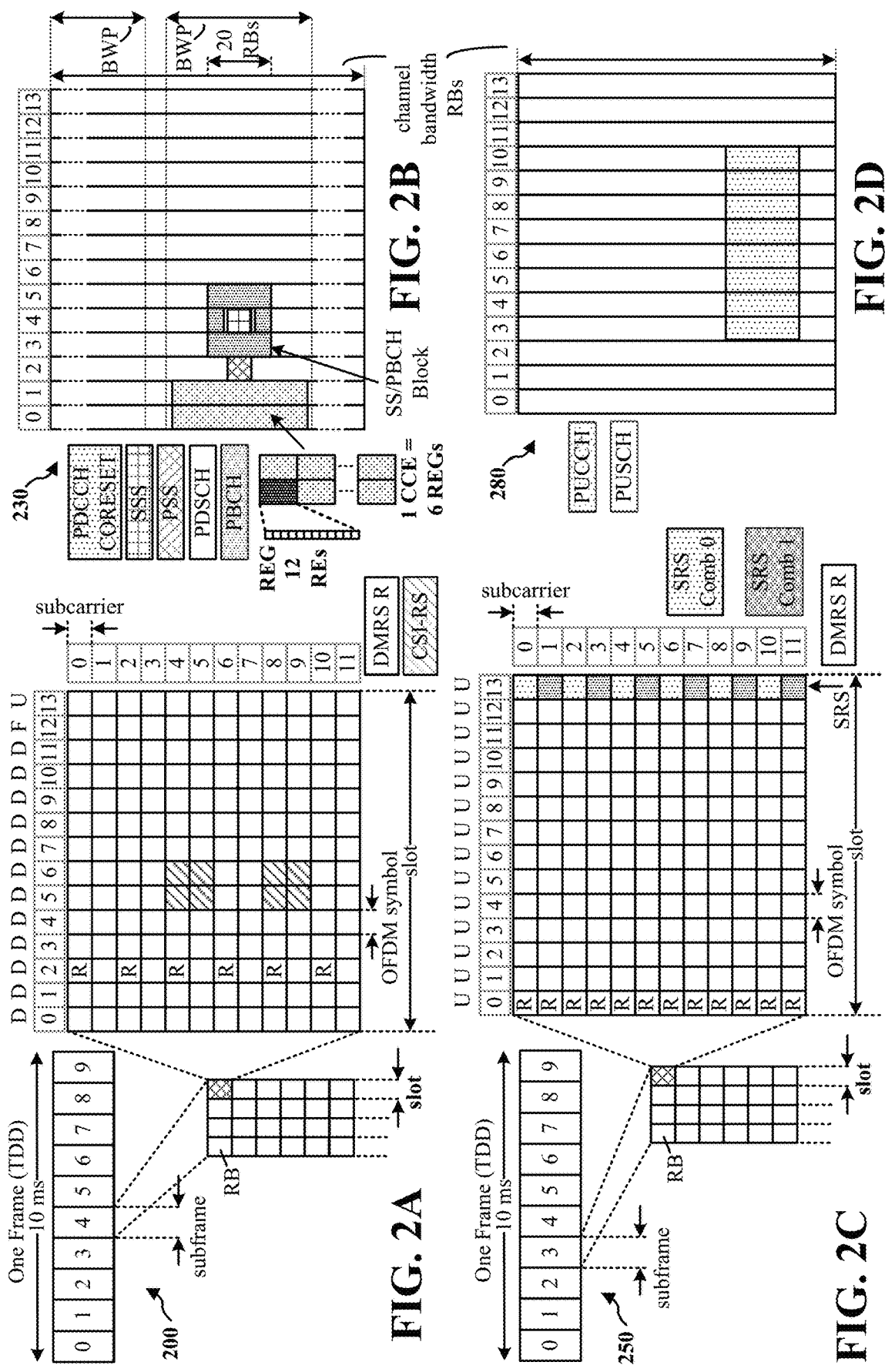
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
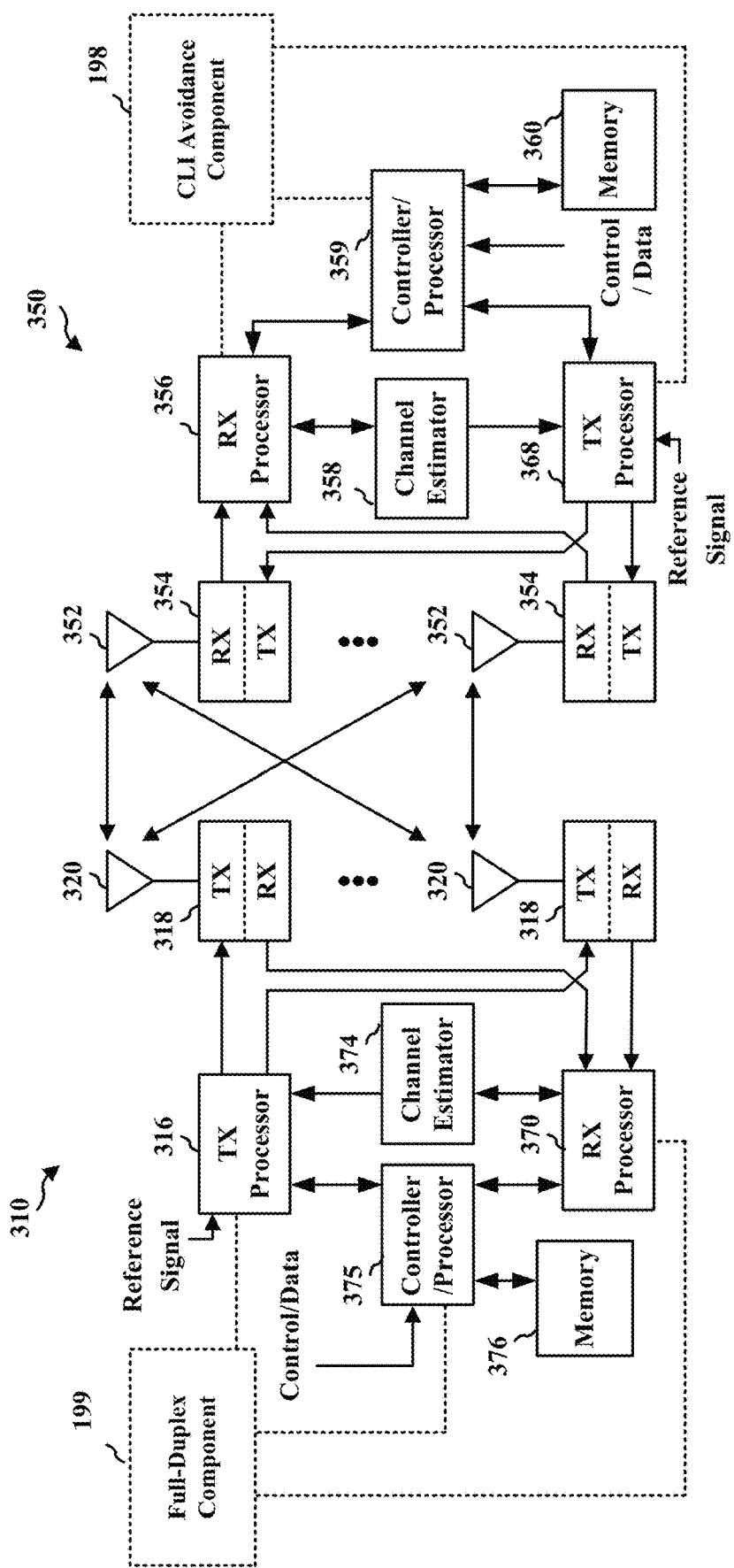
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects described in connection with the CLI avoidance component 198 of FIG. 1.

At least one of the TX processor 316, the RX processor 370, and the controller/processor 375 may be configured to perform aspects described in connection with the full-duplex component 199 of FIG. 1.

Wireless communication systems may be configured to share available system resources and provide various telecommunication services (e.g., telephony, video, data, messaging, broadcasts, etc.) based on multiple-access technologies that support communication with multiple users.

FIGS. 4A-4C illustrate various modes of full-duplex communication and associated interference that may be experienced by one or more devices. Full-duplex communication supports transmission and reception of information over a same frequency band in a manner that overlaps in time. In some aspects, the full-duplex communication may include uplink and downlink transmissions in FR2 that overlap in time. In this manner, spectral efficiency may be improved with respect to the spectral efficiency of half-duplex communication, which supports transmission or reception of information in one direction at a time without overlapping uplink and downlink communication. The full-duplex capability may be supported by a base station and/or by a UE. As an example, a UE may support uplink transmission from one antenna, or antenna panel, and simultaneous downlink reception at another antenna, or antenna panel. Simultaneous may refer to at least a partial overlap in time. As another example, the base station may transmit a downlink transmission with one antenna panel and simultaneously receive an uplink transmission from another antenna panel. In some aspects, the full-duplex capability may be conditional. As an example, a UE or a base station may support full-duplex communication if a threshold level of beam separation may be achieved. As another example, support for the full-duplex communication may be based on a self-interference condition being met, e.g., self-interference between downlink and uplink communication being below threshold level, or based on a clutter echo condition.

Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full duplex communication 400 in which a first base station 402a is in full duplex communication with a first UE 404a and a second UE 406a. The first UE 404a and the second UE 406a may be configured for half-duplex communication or full-duplex communication. FIG. 4A illustrates the first UE 404a performing downlink reception, and the second UE 406a performing uplink transmission. The second UE 406a may transmit a first uplink signal to the first base station 402a as well as to other base stations, such as a second base station 408a in proximity to the second UE 406a. The first base station 402a transmits a downlink signal to the first UE 404a concurrently (e.g., overlapping at least partially in time) with receiving the uplink signal from the second UE 406a. The base station 402a may experience self-interference at its receiving antenna that is receiving the uplink signal from UE 406a, the self-interference being due to reception of at least part of the downlink signal transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the UE 404b is also operating in a full-duplex mode. The first base station 402b and the UE 404b receive and transmit communication that overlaps in time and is in a same frequency band. The base station and the UE may each experience self-interference, due to a transmitted signal from the device leaking to (e.g., being received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c transmits and receives full-duplex communication with a first base station 402c and a second base station 408c. The first base station 402c and the second base station 408c may serve as multiple transmission and reception points (multi-TRPs) for UL and DL communication with the UE 404c. The second base station 408c may also exchange communication with a second UE 406c. In FIG. 4C, the first UE 404c may transmit an uplink signal to the first base station 402c that overlaps in time with receiving a downlink signal from the second base station 408c. The first UE 404c may experience self-interference as a result of receiving at least a portion of the first signal when receiving the second signal, e.g., the UE's uplink signal to the base station 402c may leak to (e.g., be received by) the UE's receiver when the UE is attempting to receive the signal from the other base station 408c. The first UE 404c may experience additional interference from the second UE 406c.

Figure 5:
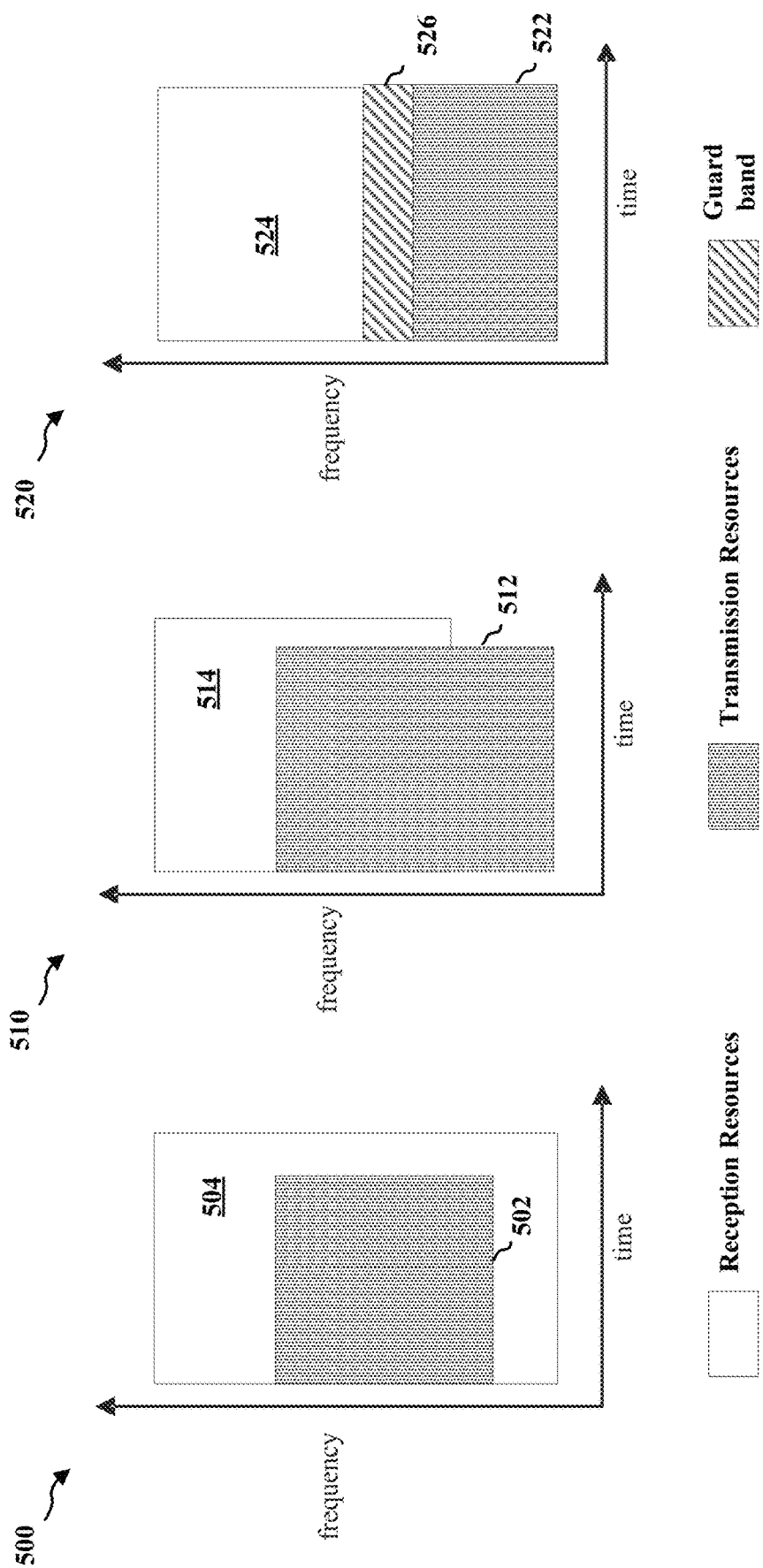
FIG. 5 illustrates example aspects of full-duplex resources, in accordance with various aspects of the present disclosure.

Full duplex communication may be in a same frequency band. The uplink and downlink communication may be in different frequency subbands, in the same frequency subband, or in partially overlapping frequency subbands. FIG. 5 illustrates a first example 500 and a second example 510 of in-band full-duplex (IBFD) resources and a third example 520 of sub-band full-duplex resources. In IBFD, signals may be transmitted and received in overlapping times and overlapping in frequency. As shown in the first example 500, a time and a frequency allocation of transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where transmission and reception resources may overlap in time using different frequencies, as shown in 520. As shown in 520, the transmission resources 522 are separated from the reception resources 524 by a guard band 526. The guard band may be frequency resources, or a gap in frequency resources, provided between the transmission resources 522 and the reception resources 524. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 502, 512, and 522 may correspond to uplink resources, and the reception resources 504, 514, and 524 may correspond to downlink resources, in some aspects. Alternatively, if the full-duplex operation is for a base station or a device implementing base station functionality, the transmission resources 502, 512, and 522 may correspond to downlink resources, and the reception resources 504, 514, and 524 may correspond to uplink resources.

A slot format may be referred to as a "D+U" slot when the slot has a frequency band that is used for both uplink and downlink transmissions. The downlink and uplink transmissions may occur in overlapping frequency resources, such as shown in 504 and 506 (e.g., in-band full duplex resources) or may occur in adjacent or slightly separated frequency resources, such as shown in 520 (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols.

Figure 6C:
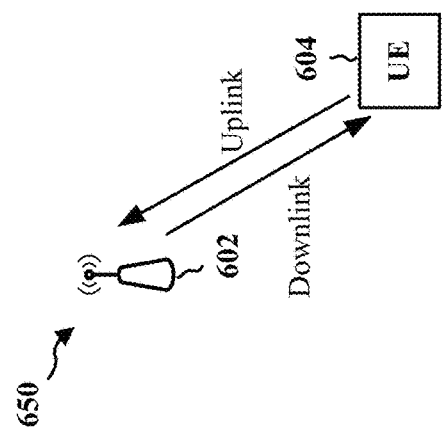
FIGS. 6A, 6B, and 6C include diagrams showing different scenarios for full-duplex communication, in accordance with various aspects of the present disclosure.
Figure 6B:
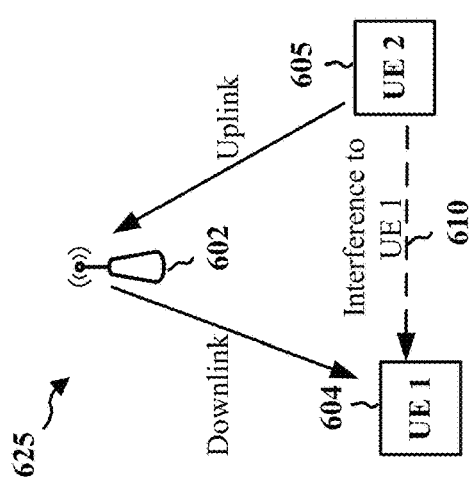
Figure 6A:
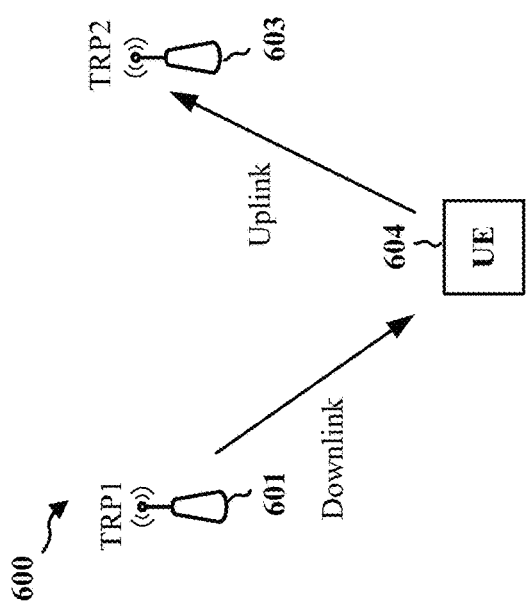

FIGS. 6A-C illustrate example scenarios in which a UE and/or a base station may exchange full-duplex communication. FIG. 6A illustrates a diagram 600 showing a single UE that transmits uplink communication to a first TRP 601, e.g., of a base station, and receives downlink communication from a second TRP 603 of the base station in a full duplex mode, e.g., in which the uplink and downlink communication are in a same frequency range and overlap at least partially in time. FIG. 6B illustrates a diagram 625 showing a single base station 602 that exchanges wireless communication with multiple UEs in a full-duplex mode. For example, the base station 602 transmits downlink communication to the first UE 604 and receives uplink communication from a second UE 605 in a full-duplex manner, e.g., in which the uplink and downlink communication are in a same frequency range and overlap at least partially in time. FIG. 6C illustrates a diagram 650 showing a single base station 602 that exchanges full-duplex communication with a single UE 604, in which the uplink and downlink communication are in a same frequency range and overlap at least partially in time.

FIG. 6B illustrates that the uplink transmission from the second UE 605 may cause cross-link interference 610 to downlink reception at the first UE 604. As an example of a downlink signal, the first UE 604 may receive a tracking reference signal (TRS) from the base station 602. The TRS may be transmitted in a wideband, e.g., across the frequency resources of the base station 602 in order to provide UEs with a single to perform a more accurate time and frequency offset estimation. The UE 604 may use the TRS to monitor and track variations across a downlink BWP, e.g., across an entire downlink BWP. As illustrated in FIG. 6B, if the base station receives uplink communication from the second UE 605 in a full-duplex mode while the UE 604 is receiving the TRS, CLI 610 from the second UE 605 may affect the TRS reception at the first UE 604. The UEs 604 and/or 605 may support half-duplex communication or may support full-duplex communication. For example, the UE 604 may operate in a half-duplex mode, yet experiences interference due to the full-duplex operation of the base station 602.

A TRS is one example of a downlink signal that may be interfered by the uplink transmission from another UE. Similarly, the first UE's reception of a synchronization signal/physical broadcast channel block (SSB) may experience interference due to the uplink transmission by the second UE 605. As another example, the first UE's reception of a synchronization signal/physical broadcast channel block (SSB) may experience interference due to the uplink transmission by the second UE 605. As another example, the first UE's reception of a channel state information reference signal (CSI-RS) may experience interference due to the uplink transmission by the second UE 605. As another example, the first UE's reception of remaining system information (RMSI) may experience interference due to the uplink transmission by the second UE 605. As another example, the first UE's monitoring of a common search space (CSS) may experience interference due to the uplink transmission by the second UE 605. As another example, the first UE's reception of a paging PDSCH may experience interference due to the uplink transmission by the second UE 605. As another example, the first UE's reception of a random access occasion (RO) may experience interference due to the uplink transmission by the second UE 605. As another example, the first UE's reception of a radio link monitoring (RLM) reference signal may experience interference due to the uplink transmission by the second UE 605. As another example, the first UE's reception of a beam failure detection (BFD) reference signal may experience interference due to the uplink transmission by the second UE 605. As another example, the first UE's reception of a PDCCH for BFD may experience interference due to the uplink transmission by the second UE 605. As another example, the first UE's reception of an SS for the BFD may experience interference due to the uplink transmission by the second UE 605. As another example, the first UE's reception of a phase tracking reference signal (PT-RS) may experience interference due to the uplink transmission by the second UE 605. As another example, the first UE's reception of a positioning reference signal (PRS) may experience interference due to the uplink transmission by the second UE 605. As another example, the first UE's reception of a reference signal associated with a modulation and coding scheme (MCS) may experience interference due to the uplink transmission by the second UE 605.

Aspects presented herein provide protection for the accurate reception of one or more reference signals or downlink channels at a first UE than may experience interference due to an uplink transmission from a second UE to a base station operating in a full-duplex mode, e.g., exchanging uplink and downlink communication in a same frequency range and overlapping in time. The full-duplex communication of the base station may be in a frequency division multiplexed (FDM) mode, e.g., in which the downlink frequency bands are separated from the uplink frequency bands by a guard band, e.g., as described in connection with 520 in FIG. 5. In some aspects, the full-duplex communication of the base station may be based on spatial divisional multiplexing (SDM), e.g., in which the uplink transmission is received in one direction, and the downlink transmission is transmitted in a different direction. The frequency separation and/or spatial separation may help to reduce the interference to the UE 604 receiving the downlink reference signal or channel. However, even with a guard band and/or a different spatial direction, the UE 604 may experience interference from the uplink transmission of the UE 605.

Figure 7:
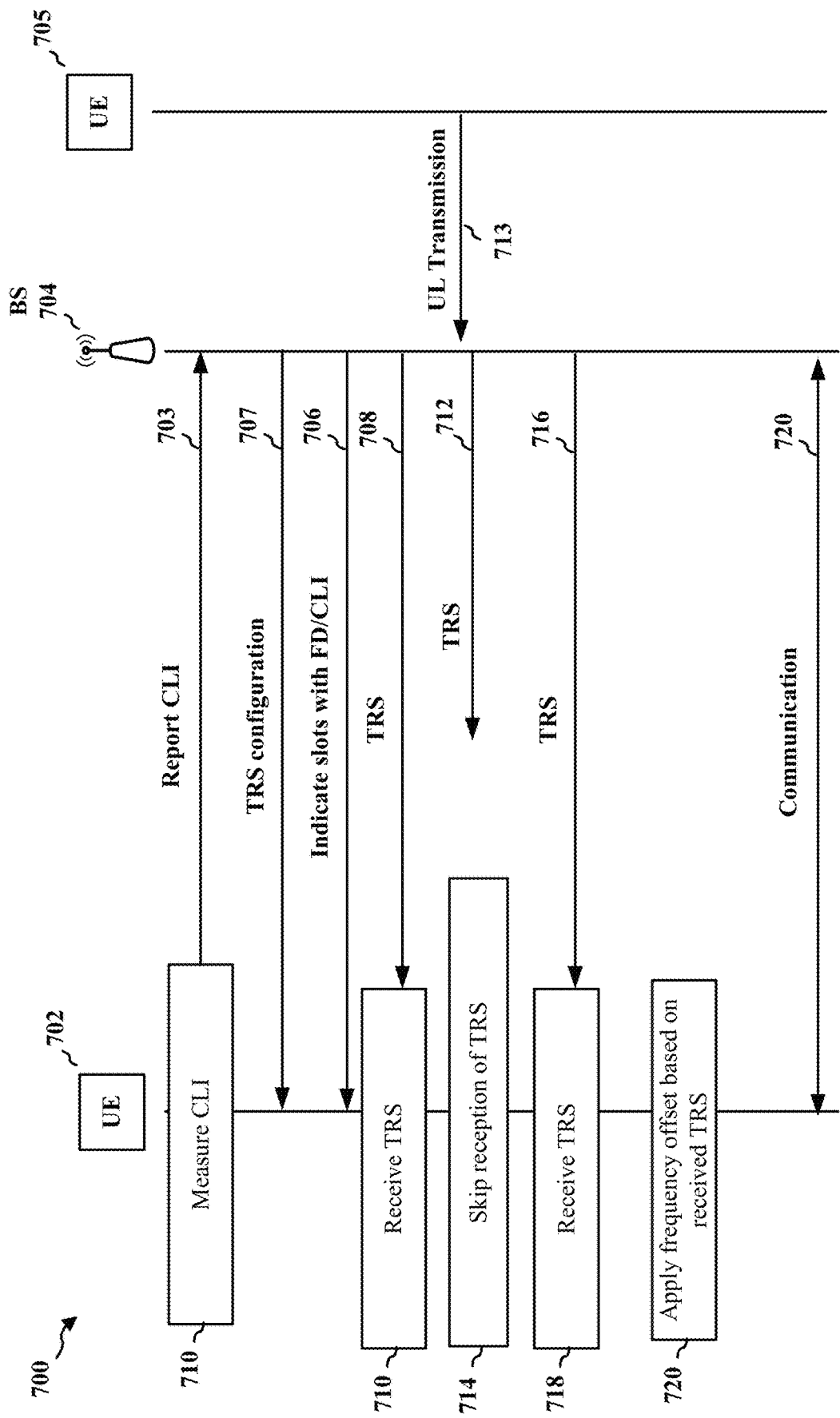
FIG. 7 is a communication between a base station and a UE that includes protecting a downlink reception from cross-link interference, in accordance with various aspects of the present disclosure.

FIG. 7 illustrates an example communication flow 700 in which a base station 704 supports full-duplex communication with a UE 702 and another UE 705. The base station 704 indicates to the UE 702 slots (or other time/frequency resources) that may experience CLI interference due to full-duplex communication of the base station 704. The UE 702 may use the indication to skip reception of, or otherwise ignore, a TRS during the indicated slots. For example, the base station 704 may transmit a TRS 708 and 716 during slots that are not indicated, and the UE 702 may receive the TRSs at 710 and 718. During an indicated slot, the UE 702 may skip reception of a TRS, e.g., as illustrated at 714. The slot may be a slot during which the base station may receive an uplink transmission 713 from the other UE 705 in a full-duplex manner with transmission of the TRS 712. In some aspects, the UE 702 may skip the reception of the TRS 712 based on the indication of the slot from the base station, at 706 and based on an estimated interference level. For example, if an estimated interference level is higher than a threshold amount, the UE 702 may skip the reception of the TRS 712, at 714. If the estimated interference level is lower than the threshold amount, the UE may receive the TRS in the indicated slot.

In some aspects, the UE 702 may measure interference in the TRS measurement, or corresponding DMRS, by subtracting an expected RSRP power from a total received RSSI. In some aspects, the UE may periodically measure CLI due to a neighbor UE, and may report the CLI measurements to the base station 704, e.g., as illustrated at 703. In some aspects, the indication, at 706, may be based on the CLI measurements reported by the UE 702. For example, the base station may determine that uplink transmissions from a neighbor UE cause CLI to the UE 702 based on the report, and the base station 704 may indicate slots in which the base station scheduled uplink transmissions from the UE 705 based on the CLI reported from the UE 702.

The UE 702 may use the received TRS to determine a time and/or frequency offset estimation. For example, at 720, the UE 702 may apply a frequency offset based on an estimation using the received TRS, e.g., 708 and 716. The UE 702 may use the frequency offset to exchange communication 720 with the base station, e.g., uplink or downlink communication. By avoiding reception of the TRS 712, the UE 702 may obtain a more accurate time/frequency offset estimation. The base station 704 may assist the UE 702 in obtaining more accurate information by informing the UE 702 of the resources that are potentially interfered due to the full-duplex operation of the base station.

Although the example in FIG. 7 is described for a TRS, the aspects may similarly be applied for other reference signals. For example, within the slots indicated at 706, the UE 702 may skip reception of an SSB, a CSI-RS, RMSI, an RO, an RLM reference signal, a BFD reference signal, an SS for BFD, a PT-RS, a PRS, and/or a reference signal associated with an MCS. The UE may similarly skip monitoring a CSS in the indicated slots and/or reception of a paging PDSCH, a PDCCH for BFD, among other examples of channels for which reception may be skipped.

As well, although the example is described with an indication of slots in order to illustrate the concept, the base station may indicate more granular time resources, such as symbols, to the UE or may indicate less granular time resources, such as frames, for the UE to skip reception of a reference signal or downlink channel due to the potential for CLI caused by an uplink transmission to the base station. The base station may indicate other time and/or frequency resources to the UE for the UE to adjust or avoid reception of a reference signal or downlink channel.

Figure 8:
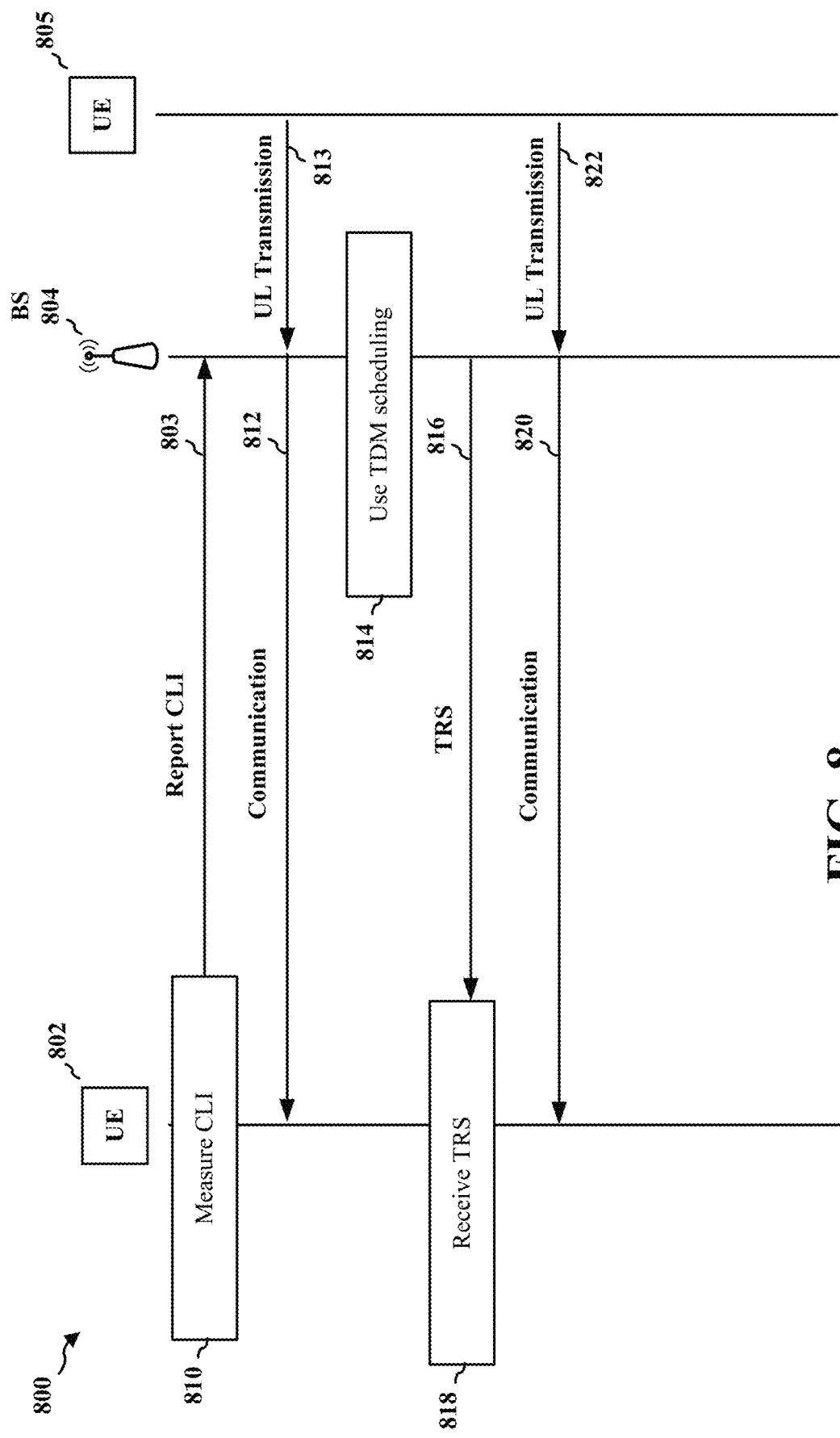
FIG. 8 is a communication between a base station and a UE that includes protecting a downlink reception from cross-link interference, in accordance with various aspects of the present disclosure.

FIG. 8 illustrates an example communication flow 800 in which a base station 804 supports full-duplex communication with a UE 802 and another UE 805. For example, FIG. 8 illustrates that the base station 804 may transmit downlink communication 812 and 820 to the UE 802 that overlaps in time with reception of uplink transmissions 813 and 822 from the UE 805. Similar to the aspects described in FIG. 7, in some aspects, the UE 802 may measure CLI, at 810, and report the measurements to the base station, at 803. In contrast to FIG. 7, in FIG. 8, the base station 804 may use TDM scheduling, at 814, to avoid scheduling uplink transmission (e.g., 813 or 822) at a time that corresponds to a downlink transmission of a particular reference signal or downlink channel. FIG. 8 illustrates an example in which the base station may avoid scheduling uplink transmissions during a time that the base station transmits the TRS 816. The TRS is only one example, that the base station may avoid uplink allocations for one or more UEs that overlap with an SSB, a CSI-RS, RMSI, an RO, an RLM reference signal, a BFD reference signal, an SS for BFD, a PT-RS, a PRS, and/or a reference signal associated with an MCS, a CSS, a paging PDSCH, and/or a PDCCH for BFD, among other examples of channels for which reception may be skipped. For example, the base station 804 may schedule uplink communication in a full-duplex mode within resources that avoid one or more reference signals or downlink channels. The restricted resources, e.g., during which full-duplex communication is to be avoided, may be based on a rule, in some aspects. In some aspects, the base station may apply the TDM scheduling in response to the CLI report 803 from the UE 802.

Figure 9A:
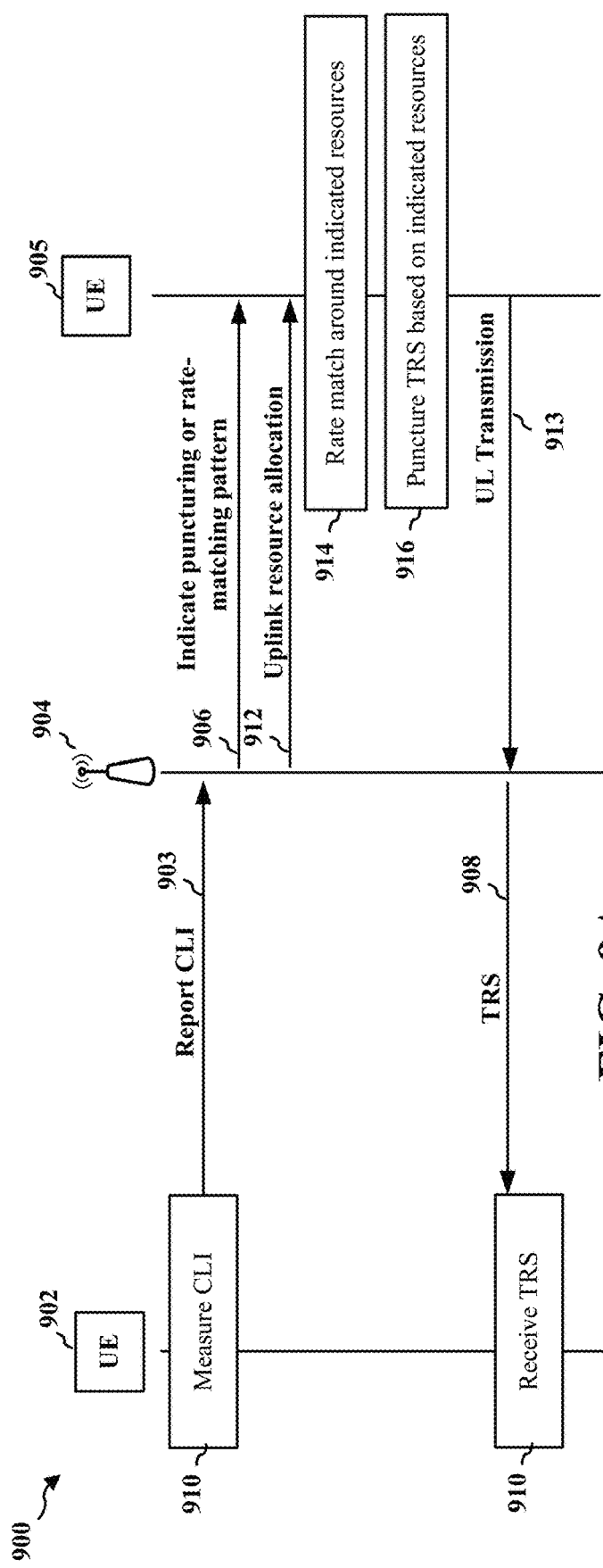
FIG. 9A is a communication between a base station and a UE that includes protecting a downlink reception from cross-link interference, in accordance with various aspects of the present disclosure.

FIG. 9A illustrates an example communication flow 900 in which a base station 904 supports full-duplex communication with a UE 902 and another UE 905. For example, FIG. 9A illustrates that the base station 904 may transmit downlink communication 908 to the UE 902 that overlaps in time with reception of uplink transmissions 913 from the UE 905. Similar to the aspects described in FIG. 7, in some aspects, the UE 902 may measure CLI, at 910, and report the measurements to the base station, at 903. At 906, the base station 904 may indicate time and/or frequency resources to the UE 905 based on the full-duplex communication scheduled for the base station 904. For example, the base station 904 may indicate to the UE 905 a pattern of resources based on downlink resources to which an uplink transmission from the UE 905 that may cause CLI for the UE 902. The base station 904 may then transmit the downlink reference signal or downlink channel, such as a TRS 908. As an example, at 914, the UE 905 may use the indicated resources, e.g., the pattern, indicated at 906 to rate match an uplink transmission around the indicated resources (e.g. the resources of the TRS 908). By rate-matching around the indicated resources for, the UE 905 may help to reduce CLI in the TRS reception, e.g., at 910, for the UE 902. In some aspects, the base station 904 may indicate a pattern that includes a guard time and/or guard tone that surrounds the TRS resources. In some aspects, as illustrated at 916, the UE may puncturing the uplink transmission based on the indicated resources. The UE 905 may then transmit the uplink transmission 913, based on the puncturing or rate-matching. For example, the base station 904 may provide the UE 905 with an allocation of uplink resources, at 912, the resources overlapping in time and frequency with the resources for a downlink reference signal, such as the TRS 908. The UE 905 may transmit the uplink transmission 913 with the allocated resources after puncturing or rate-matching around the resources (within the allocated uplink resources) that are indicated in the pattern received at 906.

Figure 9B:
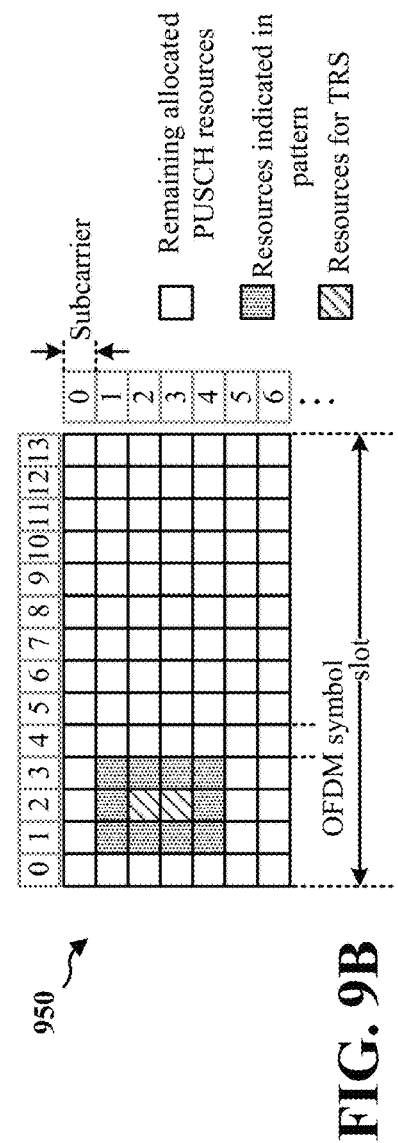
FIG. 9B illustrates a resource diagram including resources for a downlink transmission to be protected from CLI, in accordance with various aspects of the present disclosure.

As an example, the TRS 908 for reception by the UE 902 may be on symbol 2 and tone 2-3. At 906, the base station 904 may indicate an uplink rate-matching pattern or puncturing pattern that includes symbol 2 and tones 2-3. In some aspects, the base station may provide a guard time or a guard frequency in the pattern and may indicate a pattern with symbol 1-3 and tone 1-4, within which the UE 905 is not to transmit the uplink transmission 913, e.g., PUSCH. FIG. 9B illustrates an example time and frequency resource diagram 950 showing the example resources for a TRS. The base station may indicate a pattern that includes the TRS resources and additional resources, e.g., surrounding the TRS resources in time and/or frequency. The UE 905 may use the remaining allocated resources to transmit the PUSCH. The UE 905 may rate-match or puncture the PUSCH on the indicated REs. For example, the uplink transmission 913 may include a PUSCH having resource holes that protect the reception of the TRS 908 by the UE 902. In some aspects, the base station 904 may indicate a new rate-matching pattern due to the uplink puncturing around the TRS REs.

The TRS is only one example for which the base station may indicate the rate matching or puncturing pattern to the UE 905. In other examples, the base station 904 may indicate a rate-matching pattern based on resources for any of an SSB, a CSI-RS, RMSI, an RO, an RLM reference signal, a BFD reference signal, an SS for BFD, a PT-RS, a PRS, and/or a reference signal associated with an MCS, a CSS, a paging PDSCH, and/or a PDCCH for BFD, among other examples of channels for which reception may be skipped.

FIG. 10A is a flowchart 1000 of a method of wireless communication. The method may be performed by a UE (e.g., the UE 104, 350, 604, 702, or 802; the apparatus 1202). The method may improve measurements of downlink reference signals at the UE by adjusting for or reducing CLI due to full-duplex communication at the base station. In some aspects, the method may be applied for a tracking reference signal and may improve the accuracy of time and/or frequency estimations based on the TRS be protecting the TRS or measurements of the TRS from CLI from full-duplex communication.

At 1002, the UE receives a configuration for one or more downlink reference signal or downlink channel from a base station. For example, FIG. 7 illustrates that the UE 702 may receive a configuration for a TRS from the base station 704. A TRS is merely one example. In other examples, the downlink reference signal or channel may be any of an SSB, a CSI-RS, RMSI, an RO, an RLM reference signal, a BFD reference signal, an SS for BFD, a PT-RS, a PRS, and/or a reference signal associated with an MCS, a CSS, a paging PDSCH, and/or a PDCCH for BFD. The UE may use the configuration to receive the downlink reference signal from the base station. The reception of the configuration may be performed, e.g., by the DL component 1240 of the apparatus 1202 in FIG. 12.

At 1004, the UE receives an indication of one or more time and frequency resources for full-duplex communication at the base station. FIG. 7 illustrates an example of a UE 702 receiving an indication 706 of resources from a base station 704 for which full-duplex uplink transmissions to the base station from another UE may cause CLI to the TRS reception at the UE 702. The reception of the indication may be performed, e.g., by the CLI resource component 1242 of the apparatus 1202.

At 1006, the UE skips reception of the one or more downlink reference signal or downlink channel based at least in part on the indication of the one or more time and frequency resources for the full-duplex communication at the base station. FIG. 7 illustrates an example in which the UE 702 skips the reception of the TRS 712. By skipping the reception of the TRS, the UE 702 may improve the accuracy of a time/frequency estimation based on other TRSs without CLI. The skipping of the reception of the downlink reference signal or channel may be performed, e.g., by the CLI avoidance component 1244 of the apparatus 1202.

FIG. 10B illustrates example aspects of a method of wireless communication 1050 that may include 1002, 1004, and 1006 from FIG. 10A. As illustrated at 1001, the UE may further transmit a report of CLI to the base station, the indication of the one or more time and frequency resources being based on the CLI at the UE. FIG. 7 illustrates an example of a UE transmitting a report 703 to a base station. The transmission of the report may be performed, e.g., by the CLI report component 1246 of the apparatus 1202 in FIG. 12.

As illustrated at 1005, the UE may further measure cross link interference from at least one neighbor UE, wherein the UE skips the reception of the one or more downlink reference signal or downlink channel based on the one or more time and frequency resources being scheduled for uplink transmission by the at least one neighbor UE and the cross link interference from the at least one neighbor UE being higher than a threshold. The measurement may be performed, e.g., by the CLI measurement component 1248 of the apparatus 1202. The indication from the base station comprises a group common downlink control information scheduling resources for the at least one neighbor UE.

In some aspects, the configuration may be for a TRS and the UE may skip the reception of the TRS in the one or more time and frequency resources for the full-duplex communication indicated by the base station.

Figure 11:
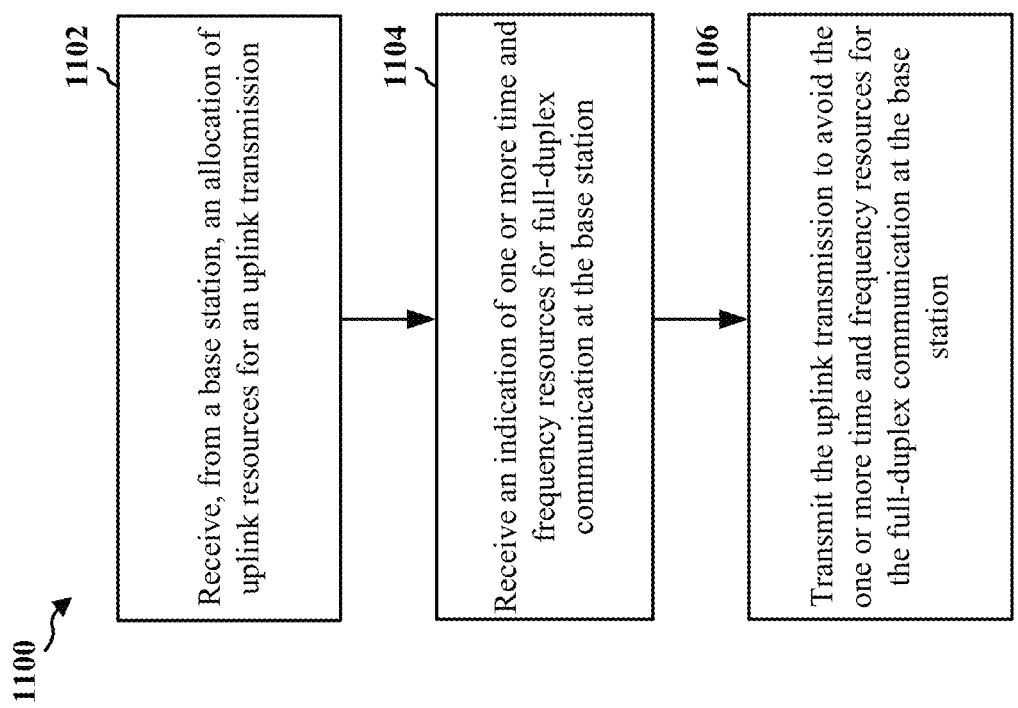
FIG. 11 is a flowchart of a method of wireless communication, in accordance with various aspects of the present disclosure.

FIG. 11 is a flowchart 1100 of a method of wireless communication. The method may be performed by a UE (e.g., the UE 104, 350, 604, 905; the apparatus 1202). The method may improve measurements of downlink reference signals at another UE by adjusting for or reducing CLI due to full-duplex communication through rate matching or puncturing of uplink transmissions at the UE.

At 1102, the UE receives, from a base station, an allocation of uplink resources for an uplink transmission. FIG. 9A illustrates an example of a UE 905 receiving an uplink resource allocation 912. The uplink resources may be allocated for a PUSCH transmission from the UE to the base station, for example. The reception of the allocation may be performed, e.g., by the uplink component 1250 of the apparatus 1202 in FIG. 12.

At 1104, the UE receives an indication of one or more time and frequency resources for full-duplex communication at the base station. FIG. 9A illustrates an example, of a UE 905 receiving an indication of resources, at 906, from a base station as a rate-matching or puncturing pattern for an uplink transmission. The one or more time and frequency resources may be for downlink reception of one or more of an SSB, a CSI-RS, RMSI, an RO, an RLM reference signal, a BFD reference signal, an SS for BFD, a PT-RS, a PRS, and/or a reference signal associated with an MCS, a CSS, a paging PDSCH, and/or a PDCCH for BFD. The reception of the indication may be performed, e.g., by the CLI resource component 1242 of the apparatus 1202.

At 1106, the UE transmits the uplink transmission to avoid the one or more time and frequency resources for the full-duplex communication at the base station. In some aspects, the uplink transmission may be a PUSCH. For example, FIG. 9A illustrates an example of a UE transmitting an uplink transmission 913 that includes puncturing or rate matching around the indicated resources. The transmission may be performed, e.g., by the CLI avoidance component 1244 of the apparatus 1202. In some aspects, the indication may comprise an uplink puncturing pattern, and the UE may puncture the uplink transmission based on the uplink puncturing pattern. In some aspects, the indication may include an uplink rate matching pattern, and the UE may rate match the uplink transmission based on the uplink rate matching pattern.

Figure 12:
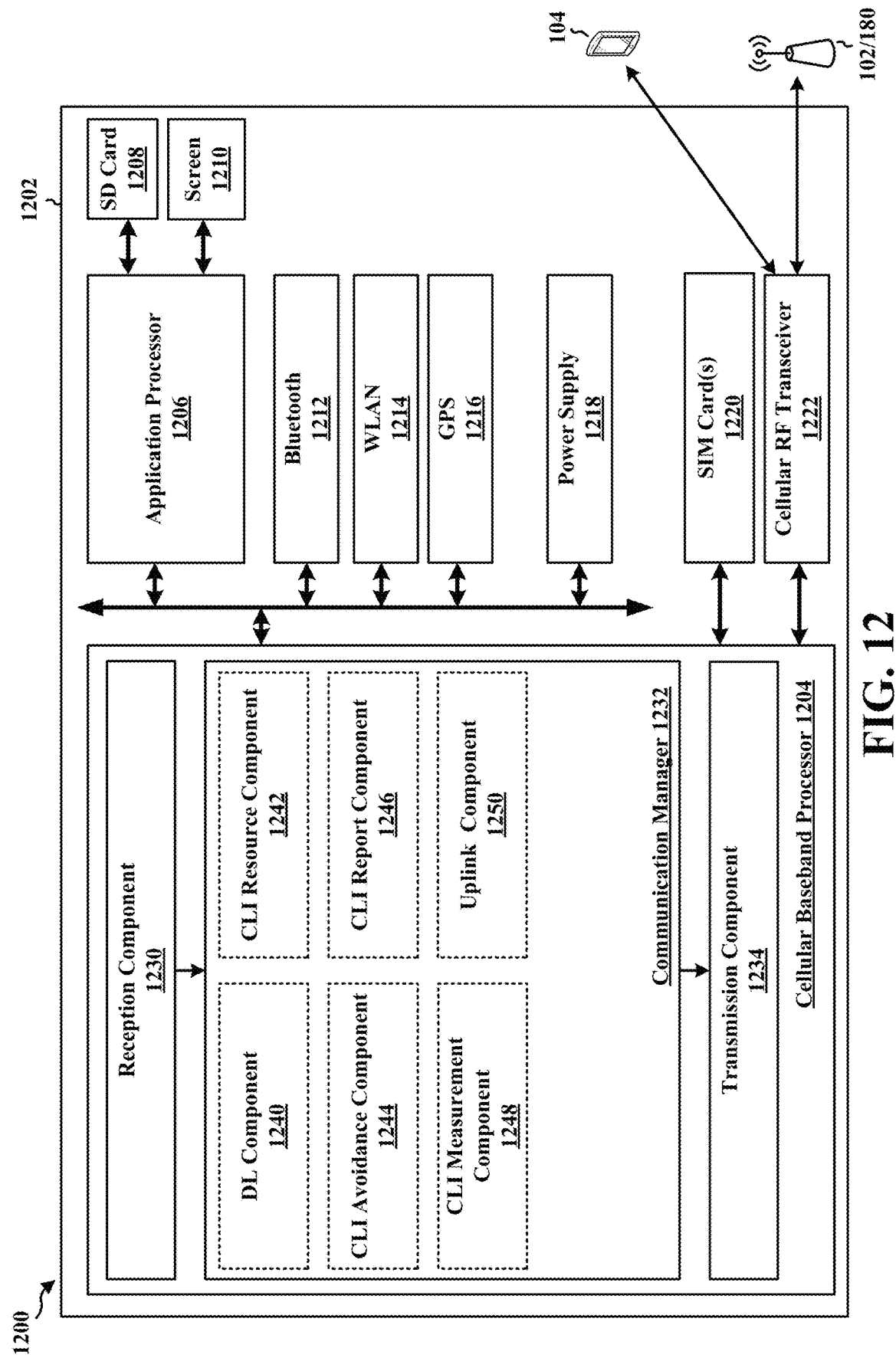
FIG. 12 is a diagram illustrating an example of a hardware implementation for an example apparatus, in accordance with various aspects of the present disclosure.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a DL RS/channel component 1240 may be configured to receive a configuration for one or more downlink reference signal or downlink channel from a base station, e.g., as described in connection with 1002 of FIGS. 10A and 10B. The CLI resource component 1242 may be configured to receive an indication of one or more time and frequency resources for full-duplex communication at the base station, e.g., as described in connection with 1004 of FIGS. 10A and 10B. The CLI avoidance component 1244 may be configured to skip reception of the one or more downlink reference signal or downlink channel based at least in part on the indication of the one or more time and frequency resources for the full-duplex communication at the base station, e.g., as described in connection with 1006 of FIGS. 10A and 10B. The apparatus 1202 may include a CLI report component 1246 configured to transmit a report of CLI to the base station, the indication of the one or more time and frequency resources being based on the CLI at the UE, e.g., as described in connection with 1001 in FIG. 10B. The apparatus 1202 may include a CLI measurement component 1248 configured to measure cross link interference from at least one neighbor UE, e.g., as described in connection with 1005 in FIG. 10B. apparatus 1202 may include an uplink component 1250 that is configured to receive, from a base station, an allocation of uplink resources for an uplink transmission, e.g., as in 1102 in FIG. 11. In some aspects, the CLI resource component 1242 may be configured to receive an indication of one or more time and frequency resources for full-duplex communication at the base station, e.g., as described in connection with 1104 in FIG. 11. In some aspects, the CLI avoidance component 1244 may be configured to transmit the uplink transmission to avoid the one or more time and frequency resources for the full-duplex communication at the base station, e.g., as described in connection with 1106 in FIG. 11.

The apparatus may include additional components that perform each of the blocks of the algorithm in the flowcharts of FIGS. 10A, 10B, 11A, 11B, and/or the aspects performed by the UE 702 in FIG. 7, the UE 802 in FIG. 8, or the UE 905 in FIG. 9A. As such, each block in the flowcharts of FIGS. 10A, 10B, 11A, 11B, and/or the aspects performed by the UE 702 in FIG. 7, the UE 802 in FIG. 8, or the UE 905 in FIG. 9A may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, may include means for receiving a configuration for one or more downlink reference signal or downlink channel from a base station; means for receiving an indication of one or more time and frequency resources for full-duplex communication at the base station; and means for skipping reception of the one or more downlink reference signal or downlink channel based at least in part on the indication of the one or more time and frequency resources for the full-duplex communication at the base station. The apparatus 1202 may further include means for transmitting a report of CLI to the base station, the indication of the one or more time and frequency resources being based on the CLI at the UE. The apparatus 1202 may further include means for measuring cross link interference from at least one neighbor UE, wherein the UE skips the reception of the one or more downlink reference signal or downlink channel based on the one or more time and frequency resources being scheduled for uplink transmission by the at least one neighbor UE and the cross link interference from the at least one neighbor UE being higher than a threshold. The apparatus 1202 may further include means for receiving, from a base station, an allocation of uplink resources for an uplink transmission; means for receiving an indication of one or more time and frequency resources for full-duplex communication at the base station; and means for transmitting the uplink transmission to avoid the one or more time and frequency resources for the full-duplex communication at the base station. The apparatus 1202 may further include means for puncturing the uplink transmission based on the uplink puncturing pattern. The apparatus 1202 may further include means for rate matching the uplink transmission based on the uplink rate matching pattern. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
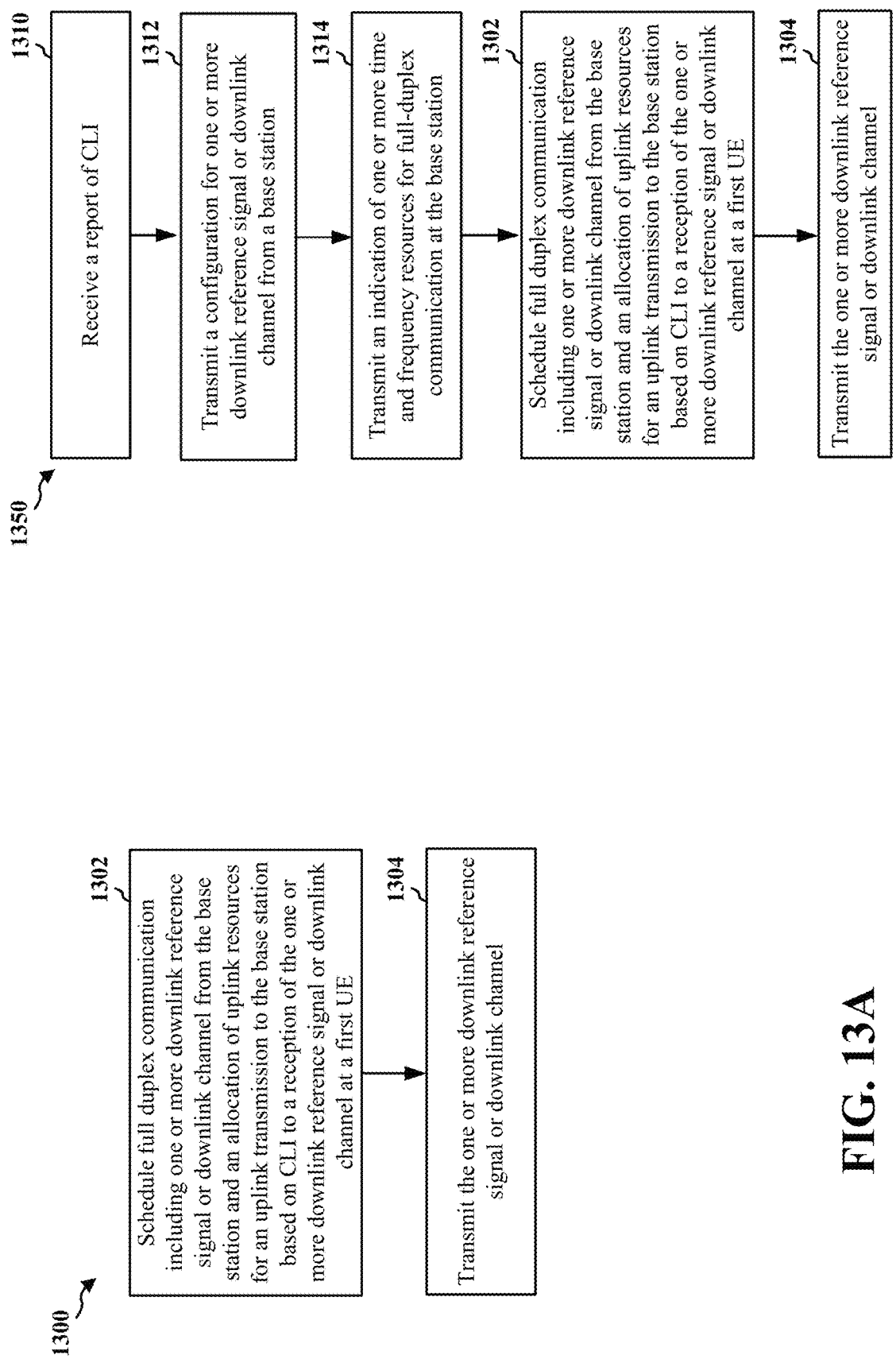
FIGS. 13A and 13B are flowcharts of methods of wireless communication, in accordance with various aspects of the present disclosure.

FIG. 13A is a flowchart 1300 of a method of wireless communication. The method may be performed by a base station (e.g., the base station 102/180, 310, 602, 704, 804, 904; the apparatus 1402). The method may improve measurements of downlink reference signals at a UE by adjusting for or reducing CLI due to full-duplex communication to protect downlink reception of a particular reference signal or downlink channel.

At 1302, the base station schedules full duplex communication including one or more downlink reference signal or downlink channel from the base station and an allocation of uplink resources for an uplink transmission to the base station based on CLI to a reception of the one or more downlink reference signal or downlink channel at a first UE. The downlink reference signal or channel may be any of an SSB, a CSI-RS, RMSI, an RO, an RLM reference signal, a BFD reference signal, an SS for BFD, a PT-RS, a PRS, and/or a reference signal associated with an MCS, a CSS, a paging PDSCH, and/or a PDCCH for BFD. In some aspects, the scheduling may be performed, e.g., by a CLI protection component 1440 of the apparatus 1402.

At 1304, the base station transmits the one or more downlink reference signal or downlink channel. FIGS. 7, 8, and 9 illustrate examples of a base station transmitting a TRS as one example of a downlink reference signal. The transmission may be performed, e.g., by the transmission component 1434 of the apparatus 1402.

FIG. 13B illustrates an example flow chart 1350 that may include 1302 and 1304 of FIG. 13A. As illustrated at 1312, the base station may transmit a configuration for the one or more downlink reference signal or downlink channel to the first UE. At 1314, the base station may transmit an indication of the uplink resources for full-duplex communication at the base station. In some aspects, the configuration may be for a TRS, and the indication indicates for the first UE to skip the reception of the TRS in the uplink resources. The transmission may be performed, e.g., by the transmission component 1434 of the apparatus 1402.

As illustrated at 1310, the base station may receive a report of the CLI from the first UE, the indication of the uplink resources being based on the CLI at the first UE. The reception may be performed, e.g., by the reception component 1430 of the apparatus 1402. FIGS. 7, 8, and 9B illustrate examples of a base station receiving a CLI report, e.g., 703, 803, or 903).

The scheduling the full duplex communication may include allocating the uplink resources to avoid an overlap in time with the one or more downlink reference signal or downlink channel.

The scheduling the full duplex communication may include transmitting the allocation of the uplink resources to a second UE; and transmitting an indication of at least one time resource for the one or more downlink reference signal or the downlink channel.

In some aspects, the indication comprises an uplink puncturing pattern, and the base station may receive the uplink transmission that avoids the at least one time resource includes based on the uplink puncturing pattern. In some aspects, the indication comprises an uplink rate matching pattern, and the base station may receive the uplink transmission based on rate matching around the at least one time resource of the uplink rate matching pattern. FIG. 9B illustrates example aspects of a pattern of resources including resources for a TRS, as an example of a downlink reference signal.

Figure 14:
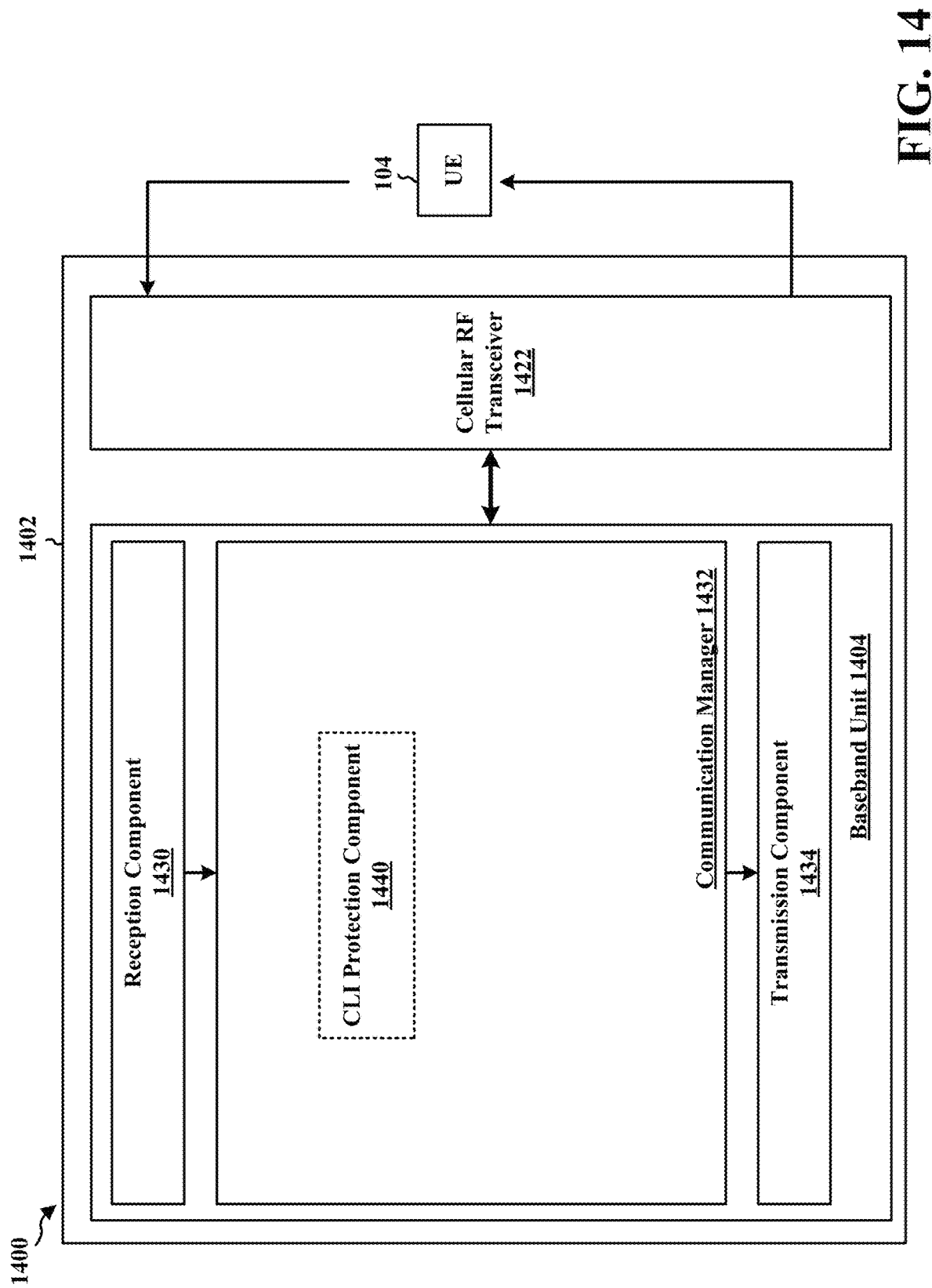
FIG. 14 is a diagram illustrating an example of a hardware implementation for an example apparatus, in accordance with various aspects of the present disclosure.

FIG. 14 is a diagram 1400 illustrating an example of a hardware implementation for an apparatus 1402. The apparatus 1402 may be a base station, a component of a base station, or may implement base station functionality. In some aspects, the apparatus 1202 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a CLI Protection component 1440 that is configured to schedule full duplex communication including one or more downlink reference signal or downlink channel from the base station and an allocation of uplink resources for an uplink transmission to the base station based on CLI to a reception of the one or more downlink reference signal or downlink channel at a first UE, e.g., as described in connection with 1302 in FIG. 13A or 13B.

The apparatus may include additional components that perform each of the blocks of the algorithm in the flowcharts of FIGS. 13A, 13B, and/or the aspects performed by the base station in any of FIGS. 7-9. As such, each block in the flowcharts of FIGS. 13A, 13B, and/or the aspects performed by the base station in any of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for scheduling full duplex communication including one or more downlink reference signal or downlink channel from the base station and an allocation of uplink resources for an uplink transmission to the base station based on CLI to a reception of the one or more downlink reference signal or downlink channel at a first UE; and means for transmitting the one or more downlink reference signal or downlink channel. The apparatus 1402 may further include means for transmitting a configuration for the one or more downlink reference signal or downlink channel to the first UE; and means for transmitting an indication of the uplink resources for full-duplex communication at the base station. The apparatus 1402 may further include means for receiving a report of the CLI from the first UE, the indication of the uplink resources being based on the CLI at the first UE. The apparatus 1402 may further include means for allocating the uplink resources to avoid an overlap in time with the one or more downlink reference signal or downlink channel. The apparatus 1402 may further include means for transmitting the allocation of the uplink resources to a second UE; and means for transmitting an indication of at least one time resource for the one or more downlink reference signal or the downlink channel. The apparatus 1402 may further include means for receiving the uplink transmission that avoids the at least one time resource includes based on the uplink puncturing pattern. The apparatus 1402 may further include means for receiving the uplink transmission based on rate matching around the at least one time resource of the uplink rate matching pattern. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication, at a user equipment (UE), comprising: receiving a configuration for one or more downlink reference signal or downlink channel from a base station; receiving an indication of one or more time and frequency resources for full-duplex communication at the base station; and skipping reception of the one or more downlink reference signal or downlink channel based at least in part on the indication of the one or more time and frequency resources for the full-duplex communication at the base station.

In aspect 2, the method of aspect 1 further includes that the one or more downlink reference signal or downlink channel comprise one or more of: a TRS, a SSB, a CSI-RS, a CSS, RMSI, paging PDSCH, a RO, a RLM reference signal, a BFD reference signal, a PDCCH for BFD, a SS for the BFD, a PT-RS, a PRS, or a reference signal associated with a MCS.

In aspect 3, the method of aspect 1 or aspect 2 further includes transmitting a report of cross link CLI to the base station, the indication of the one or more time and frequency resources being based on the CLI at the UE.

In aspect 4, the method of any of aspects 1-3 further includes measuring cross link interference from at least one neighbor UE, wherein the UE skips the reception of the one or more downlink reference signal or downlink channel based on the one or more time and frequency resources being scheduled for uplink transmission by the at least one neighbor UE and the cross link interference from the at least one neighbor UE being higher than a threshold.

In aspect 5, the method of aspect 4 further includes that the indication from the base station comprises a group common downlink control information scheduling resources for the at least one neighbor UE.

In aspect 6, the method of any of aspects 1-5 further includes that the UE receives the configuration for a TRS and skips the reception of the TRS in the one or more time and frequency resources for the full-duplex communication indicated by the base station.

Aspect 7 is an apparatus for wireless communication including at least one processor coupled to a memory, the at least one processor configured to, based at least in part on information stored in the memory, perform the method of any of aspects 1-6.

In aspect 8, the apparatus of aspect 7 further includes at least one transceiver coupled to the at least one processor.

In aspect 9, the apparatus of aspect 7 or aspect 8 further includes at least one antenna coupled to the at least one processor.

Aspect 10 is an apparatus for wireless communication including means for performing the method of any of aspects 1-6.

In aspect 11, the apparatus of aspect 10 further includes at least one transceiver.

In aspect 12, the apparatus of aspect 10 or aspect 11 further includes at least one antenna.

Aspect 13 is a non-transitory computer-readable medium storing computer executable code, where the code when executed by a processor causes the processor to implement any of aspects 1-6.

Aspect 14 is a method of wireless communication, at a UE, comprising: receiving, from a base station, an allocation of uplink resources for an uplink transmission; receiving an indication of one or more time and frequency resources for full-duplex communication at the base station; and transmitting the uplink transmission to avoid the one or more time and frequency resources for the full-duplex communication at the base station.

In aspect 15, the method of aspect 14 further includes that the one or more time and frequency resources are for downlink reception of one or more of: a TRS, a SSB, a CSI-RS, a CSS, RMSI, paging PDSCH, a RO, a RLM reference signal, a BFD reference signal, a PDCCH for BFD, a SS for the BFD, a PT-RS, a PRS, or a reference signal associated with a MCS.

In aspect 16, the method of aspect 14 or 15 further includes that the indication comprises an uplink puncturing pattern, wherein transmitting the uplink transmission to avoid the one or more time and frequency resources includes puncturing the uplink transmission based on the uplink puncturing pattern.

In aspect 17, the method of aspect 14 or 15 further includes that the indication comprises an uplink rate matching pattern wherein transmitting the uplink transmission to avoid the one or more time and frequency resources includes rate matching the uplink transmission based on the uplink rate matching pattern.

Aspect 18 is an apparatus for wireless communication including at least one processor coupled to a memory, the at least one processor configured to, based at least in part on information stored in the memory, perform the method of any of aspects 14-17.

In aspect 19, the apparatus of aspect 18 further includes at least one transceiver coupled to the at least one processor.

In aspect 20, the apparatus of aspect 18 or aspect 19 further includes at least one antenna coupled to the at least one processor.

Aspect 21 is an apparatus for wireless communication including means for performing the method of any of aspects 14-17.

In aspect 22, the apparatus of aspect 21 further includes at least one transceiver.

In aspect 23, the apparatus of aspect 21 or aspect 22 further includes at least one antenna.

Aspect 24 is a non-transitory computer-readable medium storing computer executable code, where the code when executed by a processor causes the processor to implement any of aspects 14-17.

Aspect 25 is a method of wireless communication, at a base station, comprising: scheduling full duplex communication including one or more downlink reference signal or downlink channel from the base station and an allocation of uplink resources for an uplink transmission to the base station based on CLI to a reception of the one or more downlink reference signal or downlink channel at a first UE; and transmitting the one or more downlink reference signal or downlink channel.

In aspect 26, the method of aspect 25 further includes that the one or more downlink reference signal or downlink channel comprising one or more of a TRS, a SSB, a CSI-RS, a CSS, RMSI or paging PDSCH, a RO, a RLM reference signal, a BFD reference signal, a PDCCH for BFD, a SS for the BFD, a PT-RS, a PRS, or a reference signal associated with a MCS.

In aspect 27, the method of aspect 25 or aspect 26 further includes that scheduling the full duplex communication includes: transmitting a configuration for the one or more downlink reference signal or downlink channel to the first UE; and transmitting an indication of the uplink resources for full-duplex communication at the base station.

In aspect 28, the method of any of aspects 25-27 further includes receiving a report of the CLI from the first UE, the indication of the uplink resources being based on the CLI at the first UE.

In aspect 29, the method of any of aspects 25-28 further includes that the configuration is for a TRS, and the indication indicates for the first UE to skip the reception of the TRS in the uplink resources.

In aspect 30, the method of any of aspect 25 further includes that scheduling the full duplex communication includes: allocating the uplink resources to avoid an overlap in time with the one or more downlink reference signal or downlink channel.

In aspect 31, the method of any of aspect 25 further includes that scheduling the full duplex communication includes: transmitting the allocation of the uplink resources to a second UE; and transmitting an indication of at least one time resource for the one or more downlink reference signal or the downlink channel.

In aspect 32, the method of aspect 31 further includes that the indication comprises an uplink puncturing pattern, the method further comprising: receiving the uplink transmission that avoids the at least one time resource includes based on the uplink puncturing pattern.

In aspect 33, the method of aspect 31 further includes that the indication comprises an uplink rate matching pattern, the method further comprising: receiving the uplink transmission based on rate matching around the at least one time resource of the uplink rate matching pattern.

Aspect 34 is an apparatus for wireless communication including at least one processor coupled to a memory, the at least one processor configured to, based at least in part on information stored in the memory, perform the method of any of aspects 25-33.

In aspect 35, the apparatus of aspect 34 further includes at least one transceiver coupled to the at least one processor.

In aspect 36, the apparatus of aspect 34 or aspect 35 further includes at least one antenna coupled to the at least one processor.

Aspect 37 is an apparatus for wireless communication including means for performing the method of any of aspects 25-33.

In aspect 38, the apparatus of aspect 37 further includes at least one transceiver.

In aspect 39, the apparatus of aspect 37 or aspect 38 further includes at least one antenna.

Aspect 40 is a non-transitory computer-readable medium storing computer executable code, where the code when executed by a processor causes the processor to implement any of aspects 25-33.

Aspect 41 is a method of wireless communication, at a UE, comprising: receiving a configuration for one or more downlink reference signal or downlink channel from a base station; receiving an indication of one or more time and frequency resources for full-duplex communication at the base station; and skipping reception of the one or more downlink reference signal or downlink channel based at least in part on the indication of the one or more time and frequency resources for the full-duplex communication at the base station.

In aspect 42, the method of aspect 41 further includes that the one or more downlink reference signal or downlink channel comprise one or more of: a TRS, a SSB, a CSI-RS, a CSS, RMSI or paging PDSCH, a RO, a RLM reference signal, a BFD reference signal, a PDCCH for BFD, a SS for the BFD, a PT-RS, a PRS, or a reference signal associated with a MCS.

In aspect 43, the method of aspect 41 or 42 further includes transmitting a report of CLI to the base station, the indication of the one or more time and frequency resources being based on the CLI at the UE.

In aspect 44, the method of any of aspects 41-43 further includes measuring cross link interference from at least one neighbor UE, wherein the UE skips the reception of the one or more downlink reference signal or downlink channel based on the one or more time and frequency resources being scheduled for uplink transmission by the at least one neighbor UE and the cross link interference from the at least one neighbor UE being higher than a threshold.

In aspect 45, the method of aspect 44 further includes that the indication from the base station comprises a group common downlink control information scheduling resources for the at least one neighbor UE.

In aspect 46, the method of any of aspects 41-45 further includes that the UE receives the configuration for a TRS and skips the reception of the TRS in the one or more time and frequency resources for the full-duplex communication indicated by the base station.

Aspect 47 is an apparatus for wireless communication including at least one processor coupled to a memory, the at least one processor configured to, based at least in part on information stored in the memory, perform the method of any of aspects 41-46.

In aspect 48, the apparatus of aspect 47 further includes at least one transceiver coupled to the at least one processor.

In aspect 49, the apparatus of aspect 47 or aspect 48 further includes at least one antenna coupled to the at least one processor.

Aspect 50 is an apparatus for wireless communication including means for performing the method of any of aspects 41-46.

In aspect 51, the apparatus of aspect 50 further includes at least one transceiver.

In aspect 52, the apparatus of aspect 50 or aspect 51 further includes at least one antenna.

Aspect 53 is a non-transitory computer-readable medium storing computer executable code, where the code when executed by a processor causes the processor to implement any of aspects 41-46.

The invention claimed is:

1. An apparatus for wireless communication, at a user equipment (UE), comprising:
   memory; and
   at least one processor coupled to the memory and configured to, based at least in part on information stored in the memory:
      receive a configuration for reception of one or more downlink reference signal or downlink channel from a base station;
      receive an indication of one or more time and frequency resources for full-duplex communication at the base station including at least one uplink resource for use by an other UE with the base station; and
      skip the reception of the one or more downlink reference signal or the downlink channel based at least in part on the indication of the one or more time and frequency resources for the full-duplex communication at the base station including the at least one uplink resource for use by the other UE that overlaps in time with the one or more downlink reference signal or the downlink channel.

2. The apparatus of claim 1, wherein the one or more downlink reference signal or the downlink channel comprise one or more of:
   a tracking reference signal (TRS),
   a synchronization signal/physical broadcast channel block (SSB),
   a channel state information reference signal (CSI-RS),
   a common search space (CSS),
   remaining system information (RMSI),
   a paging physical downlink shared channel (PDSCH),
   a random access occasion (RO),
   a radio link monitoring (RLM) reference signal,
   a beam failure detection (BFD) reference signal,
   a physical downlink control channel (PDCCH) for BFD,
   a synchronization signal (SS) for the BFD,
   a phase tracking reference signal (PT-RS),
   a positioning reference signal (PRS), or
   a reference signal associated with a modulation and coding scheme (MCS).

3. The apparatus of claim 1, wherein the at least one processor is further configured to:
   transmit a report of cross link interference (CLI) to the base station, the indication of the one or more time and frequency resources being based on the CLI at the UE.

4. The apparatus of claim 1, wherein the at least one processor is further configured to:
   measure cross link interference from at least one neighbor UE, wherein the UE skips the reception of the one or more downlink reference signal or the downlink channel based on the one or more time and frequency resources being scheduled for uplink transmission by the at least one neighbor UE and the cross link interference from the at least one neighbor UE being higher than a threshold.

5. The apparatus of claim 4, wherein the indication from the base station comprises a group common downlink control information scheduling resources for the at least one neighbor UE.

6. The apparatus of claim 1, wherein the configuration is for a tracking reference signal (TRS) and to skip the reception, the at least one processor is configured to:
   skip the reception of the TRS in the one or more time and frequency resources for the full-duplex communication indicated by the base station.

7. The apparatus of claim 1, further comprising:
   at least one transceiver coupled to the at least one processor.

8. An apparatus for wireless communication, at a user equipment (UE), comprising:
   memory; and
   at least one processor coupled to the memory and configured to, based at least in part on information stored in the memory:
      receive, from a base station, an allocation of uplink resources for an uplink transmission;
      receive an indication of one or more time and frequency resources for full-duplex communication at the base station, wherein the allocation of the uplink resources overlaps in time and frequency with downlink communication resources for a different UE in the one or more time and frequency resources for the full-duplex communication; and
      transmit the uplink transmission to avoid at least a portion of the downlink communication resources of the one or more time and frequency resources for the full-duplex communication at the base station.

9. The apparatus of claim 8, wherein the at least one processor is configured to transmit the uplink transmission to avoid at least the downlink communication resources for downlink reception of one or more of:
   a tracking reference signal (TRS),
   a synchronization signal/physical broadcast channel block (SSB),
   a channel state information reference signal (CSI-RS),
   a common search space (CSS),
   remaining system information (RMSI),
   a paging physical downlink shared channel (PDSCH),
   a random access occasion (RO),
   a radio link monitoring (RLM) reference signal,
   a beam failure detection (BFD) reference signal,
   a physical downlink control channel (PDCCH) for BFD,
   a synchronization signal (SS) for the BFD,
   a phase tracking reference signal (PT-RS),
   a positioning reference signal (PRS), or
   a reference signal associated with a modulation and coding scheme (MCS).

10. The apparatus of claim 8, wherein the indication indicates an uplink puncturing pattern, wherein to transmit the uplink transmission to avoid the one or more time and frequency resources, the at least one processor is configured to puncture the uplink transmission on the allocation of the uplink resources based on the uplink puncturing pattern.

11. The apparatus of claim 8, wherein the indication comprises an uplink rate matching pattern wherein to transmit the uplink transmission to avoid the one or more time and frequency resources, the at least one processor is configured to rate match the uplink transmission on the allocation of the uplink resources based on the uplink rate matching pattern.

12. The apparatus of claim 8, further comprising:
at least one transceiver coupled to the at least one processor.

13. An apparatus for wireless communication, at a base station, comprising:
memory; and
at least one processor coupled to the memory and configured to, based at least in part on information stored in the memory:
schedule, based on cross link interference (CLI) to a reception of one or more downlink reference signal or downlink channel at a first user equipment (UE), full duplex communication including the one or more downlink reference signal or the downlink channel from the base station and an allocation of uplink resources for an uplink transmission to the base station including a configuration for the one or more downlink reference signal or the downlink channel to a first UE and an indication of the uplink resources for full-duplex communication at the base station with a second UE, wherein the indication indicates:
for the first UE to skip the reception of the one or more downlink reference signal or the downlink channel when resources configured for the one or more downlink reference signal or the downlink channel overlap in time with the uplink resources for the full-duplex communication with the second UE, or
an uplink puncturing pattern or an uplink rate matching pattern for the uplink resources allocated for the second UE when the uplink resources overlap in time with the resources configured for the one or more downlink reference signal or the downlink channel; and
transmit the one or more downlink reference signal or the downlink channel.

14. The apparatus of claim 13, wherein the one or more downlink reference signal or the downlink channel comprising one or more of:
a tracking reference signal (TRS),
a synchronization signal/physical broadcast channel block (SSB),
a channel state information reference signal (CSI-RS),
a common search space (CSS),
remaining system information (RMSI),
a paging physical downlink shared channel (PDSCH),
a random access occasion (RO),
a radio link monitoring (RLM) reference signal,
a beam failure detection (BFD) reference signal,
a physical downlink control channel (PDCCH) for BFD,
a synchronization signal (SS) for the BFD,
a phase tracking reference signal (PT-RS),
a positioning reference signal (PRS), or
a reference signal associated with a modulation and coding scheme (MCS).

15. The apparatus of claim 13, wherein the indication indicates for the first UE to skip the reception of the one or more downlink reference signal or the downlink channel when resources configured for the one or more downlink reference signal or the downlink channel overlap in time with the uplink resources for the full-duplex communication with the second UE.

16. The apparatus of claim 15, wherein the at least one processor is further configured to:
receive a report of the CLI from the first UE, the indication of the uplink resources being based on the CLI at the first UE.

17. The apparatus of claim 15, wherein the configuration is for a tracking reference signal (TRS), and the indication indicates for the first UE to skip the reception of the TRS in the uplink resources.

18. The apparatus of claim 13, wherein to schedule the full duplex communication, the at least one processor is configured to:
transmit the allocation of the uplink resources to the second UE; and
transmit the indication of at least one time resource for the one or more downlink reference signal or the downlink channel.

19. The apparatus of claim 18, wherein the indication comprises the uplink puncturing pattern, the at least one processor being further configured to:
receive the uplink transmission that avoids the at least one time resource includes based on the uplink puncturing pattern.

20. The apparatus of claim 18, wherein the indication comprises the uplink rate matching pattern, the at least one processor being further configured to:
receive the uplink transmission based on rate matching around the at least one time resource of the uplink rate matching pattern.

21. The apparatus of claim 13, further comprising:
at least one transceiver coupled to the at least one processor.

22. A method of wireless communication, at a user equipment (UE), comprising:
receiving a configuration for reception of one or more downlink reference signal or downlink channel from a base station;
receiving an indication of one or more time and frequency resources for full-duplex communication at the base station including at least one uplink resource for use by an other UE with the base station; and
skipping the reception of the one or more downlink reference signal or the downlink channel based at least in part on the indication of the one or more time and frequency resources for the full-duplex communication at the base station including the at least one uplink resource for use by the other UE that overlaps in time with the one or more downlink reference signal or the downlink channel.

23. The method of claim 22, wherein the one or more downlink reference signal or the downlink channel comprise one or more of:
a tracking reference signal (TRS),
a synchronization signal/physical broadcast channel block (SSB),
a channel state information reference signal (CSI-RS),
a common search space (CSS),
remaining system information (RMSI),
a paging physical downlink shared channel (PDSCH),
a random access occasion (RO),
a radio link monitoring (RLM) reference signal,
a beam failure detection (BFD) reference signal,
a physical downlink control channel (PDCCH) for BFD,
a synchronization signal (SS) for the BFD,
a phase tracking reference signal (PT-RS),
a positioning reference signal (PRS), or a reference signal associated with a modulation and coding scheme (MCS).

24. The method of claim 22, further comprising:
transmitting a report of cross link interference (CLI) to the base station, the indication of the one or more time and frequency resources being based on the CLI at the UE.

25. The method of claim 22, further comprising:
measuring cross link interference from at least one neighbor UE, wherein the UE skips the reception of the one or more downlink reference signal or the downlink channel based on the one or more time and frequency resources being scheduled for uplink transmission by the at least one neighbor UE and the cross link interference from the at least one neighbor UE being higher than a threshold.

26. The method of claim 25, wherein the indication from the base station comprises a group common downlink control information scheduling resources for the at least one neighbor UE.

27. The method of claim 22, wherein the UE receives the configuration for a tracking reference signal (TRS) and skips the reception of the TRS in the one or more time and frequency resources for the full-duplex communication indicated by the base station.

\* \* \* \* \*